United States Patent [19]

Brown

[11] 4,438,362

[45] Mar. 20, 1984

[54] SELF-STARTING, DIRECT CURRENT MOTOR WITH PERMANENT MAGNETS OF VARIED MAGNETIC STRENGTH

[75] Inventor: Fred A. Brown, Woodstock, N.Y.

[73] Assignee: Rotron, Incorporated, Woodstock, N.Y.

[21] Appl. No.: 409,712

[22] Filed: Aug. 19, 1982

[51] Int. Cl.³ .......................................... H02K 21/12
[52] U.S. Cl. ................................. 310/152; 310/154; 310/156; 335/296; 335/302
[58] Field of Search ............... 310/154 F, 156 F, 154, 310/156, 41, 163, 152, 4; 335/302, 306, 284, 296

[56] References Cited

U.S. PATENT DOCUMENTS

| | | |
|---|---|---|
| 1,761,836 | 6/1930 | Macfarlane et al. |
| 1,976,880 | 10/1934 | Graseby . |
| 2,227,894 | 1/1941 | Elms . |
| 2,240,652 | 5/1941 | Jenkins . |
| 2,250,395 | 7/1941 | Russell . |
| 2,601,517 | 6/1952 | Hammes .............................. 310/156 |
| 3,032,670 | 5/1962 | Fritz . |
| 3,164,734 | 1/1965 | Heinzen . |
| 3,214,620 | 10/1965 | Smith et al. |
| 3,264,538 | 8/1966 | Brailsford . |
| 3,299,335 | 1/1967 | Wessels . |
| 3,433,987 | 3/1969 | Thees . |
| 3,493,831 | 2/1970 | Roberts . |
| 3,644,809 | 2/1972 | Lahde . |
| 3,739,248 | 6/1973 | Wehde . |
| 3,860,843 | 1/1975 | Kawasaki et al. |
| 3,873,897 | 3/1975 | Muller . |
| 4,023,057 | 5/1977 | Meckling ........................... 310/154 |
| 4,110,718 | 8/1978 | Odor et al. ......................... 310/154 |
| 4,237,397 | 12/1980 | Mohr et al. ........................ 310/156 |

Primary Examiner—J. D. Miller
Assistant Examiner—D. L. Rebsch
Attorney, Agent, or Firm—Brumbaugh, Graves, Donohue & Raymond

[57] ABSTRACT

A permanent magnet, direct current motor is made self-starting by the use of permanent magnets with varying magnetization. The use of permanent magnets with varying magnetization results in a rotor position after motor de-energization such that the rotor is angularly offset from a cogged position. This type of motor is made by first, placing uniformly magnetized magnets in a rotor, placing the rotor in an air gap of a toroid on a fixture with a key that correctly positions the rotor, applying a satisfactory magnetic field for a suitable amount of time so that the desired varying magnetization is produced, and finally, assembling the rotor in operative association with the stator so that the at-rest position of the rotor is angularly offset in the direction of rotor rotation from a cogged position.

8 Claims, 7 Drawing Figures

SELF-STARTING, DIRECT CURRENT MOTOR WITH PERMANENT MAGNETS OF VARIED MAGNETIC STRENGTH

BACKGROUND OF THE INVENTION

This invention relates to permanent magnet, direct current motors which are rendered self-starting.

It is possible in direct current motors with permanent magnets, ordinarily on the rotor, after de-energization of the motor, for the rotor to come to rest in a position where there will be no torque on the rotor upon re-energization of the motor. Such a position is termed a cogged position. Positions where there is no torque on the rotor upon re-energization of the motor are the positions where the axis of the magnetic field produced by the rotor is either in the same direction as or in the opposite direction from the axis of the magnetic field produced by the stator. In other words, there is no torque on the rotor upon re-energization of the motor if the axis of the magnetic field produced by the rotor is either completely in phase with (0 electrical degrees) or completely out of phase with (180 electrical degrees) the axis of the magnetic field produced by the stator. In either case, the motor will not start. Moreover, saliencies of the wound motor component are likely to cause the rotor to come to rest at just the cogged position, this being the position of least reluctance, unless the motor design has taken cogging into account.

One technique that is used to make a permanent magnet, direct current motor self-starting is to provide permanent magnets on the stator to attract the permanently magnetized rotor magnets, so that after motor de-energization the rotor is angularly offset from a cogged position. However, use of this technique results in a motor that does not run smoothly.

Another technique that is used to make a permanent magnet, direct current motor self-starting is to provide reluctance modifications in the magnetic circuit to position the rotor after motor de-energization so that the rotor is angularly offset from a cogged position. Suggested reluctance modifications used to position the rotor have included manual means, use of auxiliary windings, use of stator pole pieces that have a varying reluctance in the direction of rotor movement, and use of a rotor and a stator wherein the width of the air gap between the rotor and the stator is nonuniform.

However, there are problems with using these reluctance modifications. Use of manual means results in a cumbersome, complex motor that requires an operator. Use of auxiliary windings results in a complex motor. Use of pole pieces that have a varying reluctance and use of a rotor and a stator where the width of the air gap between the rotor and the stator is nonuniform may necessitate the use of more costly manufacturing processes or may result in very little displacement from the cogged position.

BRIEF SUMMARY OF THE INVENTION

This invention includes a self-starting, permanent magnet, direct current motor having permanent magnets of varying magnetic strength and the method for making that motor. Rotor permanent magnets with varying magnetization in the direction of rotation result in a rotor position after motor de-energization such that the rotor is angularly offset from a cogged position.

The use of permanent magnets with varying magnetization on the rotor allows easy fabrication of the rotor assembly, i.e., the rotor housing and the rotor magnets mounted therein. The rotor assembly is not complex mechanically; the entire motor is not complex mechanically. The apparatus used to produce the varying magnetization in the magnets is readily available, easily adapted to this use, and easy to operate; the use of difficult and/or expensive manufacturing processes is not necessary. The invention solves the problems of equipment complexity and manufacturing difficulty that exist in the prior art.

In one motor according to the invention, permanent rotor magnets have a magnetic strength (flux density) that varies in their circumferential direction. To wit, the arcuate permanent magnets of the motor, a brushless, direct current motor, gradually decrease in the direction of rotation to cause the magnets to align with saliencies of the stator at an angular position other than the cogged positions.

In a method of making a permanent magnet, direct current motor according to one aspect of the invention, uniformly magnetized permanent magnets are installed in a rotor, the rotor is mounted on a fixture in an air gap of a toroid, a demagnetizing magnetic field is applied for a suitable amount of time and in such a manner so as to produce a varying magnetic strength (flux density) in the rotor magnets, and the rotor is assembled in operative association with a stator.

The varying magnetic strength magnets of the invention can be used to supplement prior art techniques, if desired, for example, the salient poles on the wound (ordinarily stator) component may be shaped for effecting a varying air gap tending to keep the motor components from their cogged position.

The above and further advantages of this invention will be better understood with reference to the following detailed description of the preferred embodiments taken in combination with the attached drawings.

DETAILED DESCRIPTION OF THE PREFERRED EMBODIMENTS

Figure 1:
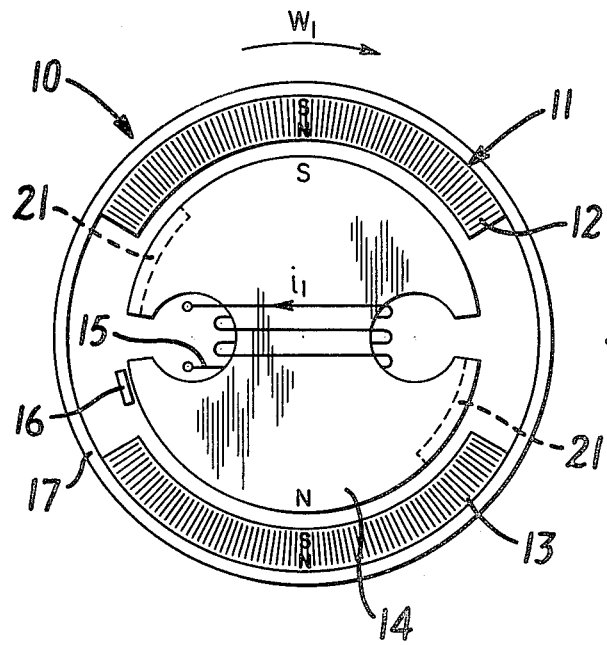
FIG. 1 is a diagrammatic illustration of an inverted, brushless, permanent magnet, direct current motor with conventionally magnetized rotor magnets at rest in a cogged position.

While this invention is susceptible of embodiment in many different forms, there is shown in the drawings and will herein be described in detail specific embodiments, with the understanding that the present disclosure is to be considered as an exemplification of the principles of the invention and is not intended to limit the invention to the embodiments illustrated.

This invention relates to permanent magnet, direct current motors. Typically, in these motors, the current in the stator winding is commutated based on the position of the rotor in order to produce motor action. Various devices are used to sense the position of the rotor and commutate the current in the stator winding, e.g., brushes and commutator rings, optical devices, and Hall effect devices. The apparatus and method for sensing the position of the rotor and commutating the current in the stator winding form no part of this invention.

In FIG. 1, an inverted, brushless, permanent magnet, direct current motor 10 comprises a salient pole stator 14 and a rotor 11. The rotor has a rotor housing 17 and rotor magnets 12 and 13. The rotor rotates around the outside of the stator in the direction of the arrow $w_1$. Under control of Hall device 16, current $i_1$ flows through a winding 15 to produce a magnetic field in the stator. The orientation of the magnetic field in the stator is shown by the designations "N" and "S" on the stator in FIG. 1. By commutation this current $i_1$ is reversed at 180° intervals to reverse the stator poles and rotate the rotor continuously. The magnetization of the rotor magnets is indicated by the lines 16.

In FIG. 1, the rotor magnets 12 and 13 are conventionally magnetized since they have a uniform magnetization. When the motor 10 is de-energized, the magnets tend to come to rest in alignment with the stator saliencies, in a position of least reluctance, tending to position the rotor 11 in the cogged position as shown in FIG. 1. If the rotor is in a cogged position when current $i_1$ starts flowing through the winding 15, no torque will be produced on the rotor and, consequently, the rotor will not rotate.

A prior art technique for avoiding cogging is indicated in FIG. 1 by notches 21 formed on the stator poles. These modify the reluctance across the gap by varying the gap width. The rotor tends to come to rest slightly forward of its cogged position.

Figure 2:
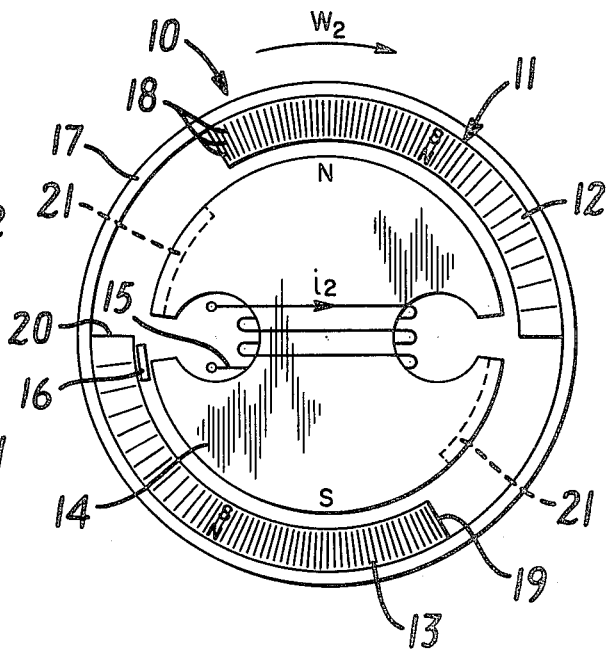
FIG. 2 is a diagrammatic illustration of a motor like that of FIG. 1 with rotor magnets according to this invention in a noncogged at-rest position immediately upon energization of the stator winding.

FIG. 2 illustrates an embodiment of the invention in which permanent magnets with varying magnetization are used to make such a motor self-starting. In FIG. 2, like numerals designate like elements. The direction of rotation is shown by the arrow $w_2$. Current $i_2$ flows through the winding 15 to produce a magnetic field in the stator 14. The orientation of the magnetic field in the stator is shown by the designations "N" and "S" on the stator in FIG. 2 and is reversed from that of FIG. 1 by virtue of magnet 13 having moved proximate the Hall device 16. The magnetization of the rotor magnets 12 and 13 is indicated by the lines 18. The magnetization of each rotor magnet is gradually varying circumferentially from a location of strongest magnetization near the trailing end 19 to a location of weakest magnetization near the leading end 20.

The rotor magnets with varying magnetization tend to position the rotor in a noncogged at-rest position, as shown in FIG. 2. When current $i_2$ starts flowing through the winding, a torque on the rotor will be produced and the rotor will begin to rotate.

The commutation of the stator windings is such that the current $i_2$ is initiated so that the axis of the magnetic field produced by the rotor is nearly 180 electrical degrees out of phase with the axis of the magnetic field produced by the stator. The current $i_2$ could be initiated so that the axes are nearly 0 electrical degrees out of phase and could be commutated when the axes are in phase, i.e., when the next cogged position is reached. However, by initiating current $i_2$ so that the axes are nearly 180 electrical degrees out of phase, the rotor will have a higher angular velocity and a greater kinetic energy upon reaching the next cogged position, and the rotational momentum of the rotor will carry the rotor past the next cogged position.

The rotor magnets of FIG. 2 can be employed with stator poles shaped to vary the reluctance across the gap between stator and rotor as at notches 21 in FIG. 1. In this case, the tendency of the rotor to come to rest at the noncogged position is even further enhanced.

Permanent magnets with varying magnetization can be used to make other permanent magnet, direct current motors self-starting. For example, FIGS. 3 and 4 show a brushless DC motor in which the rotor magnets are conventionally mounted, internally of a stator.

Figure 3:
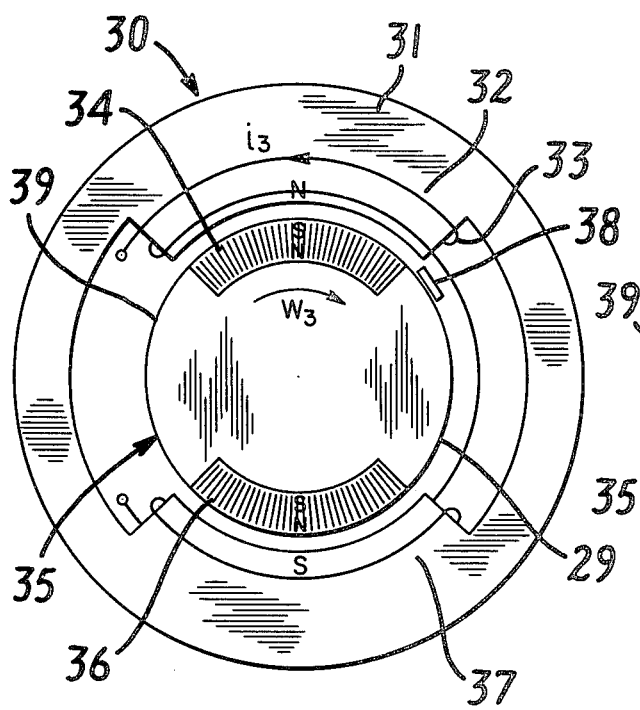
FIG. 3 is a diagrammatic illustration of another brushless, permanent magnet, direct current motor with conventionally magnetized rotor magnets at rest in a cogged position.
Figure 4:
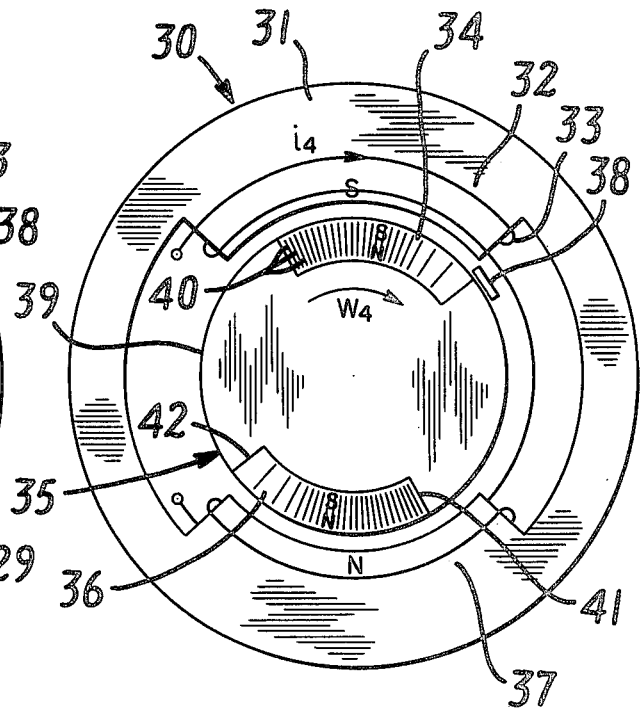
FIG. 4 is a diagrammatic illustration of a motor like that of FIG. 3 with rotor magnets according to this invention in a noncogged at-rest position immediately upon energization of the stator winding.

In FIG. 3, the motor 30 has a stator 31 with salient poles 32 and 37 and a rotor 35. The rotor 35 includes a rotor housing 39 and rotor magnets 34 and 36. The rotor rotates within the stator in the direction of the arrow $w_3$ when current $i_3$ flows through a winding 33 under control of a Hall device 38 and associated circuitry. The orientation of the stator field is shown by the designations "N" and "S". Conventional, uniform magnetization of the rotor magnets is indicated by the lines 38. When the motor 30 is de-energized, the rotor tends to the cogged position shown. If the rotor is in a cogged position when energized, no torque will be produced on the rotor and, consequently, the rotor will not rotate.

Again, permanent magnets with varying magnetization make this type of motor self-starting. In FIG. 4, like numerals designate like elements. The direction of rotation is $w_4$. Current $i_4$ flows through the winding 33 to produce the magnetic field orientation shown by "N" and "S" on the stator in FIG. 4, the current in FIG. 4 having been reversed by the magnet 34's moving proximate the Hall sensor. The magnetization of the rotor magnets 34 and 36 is indicated by the lines 40, varying from a location of strongest magnetization near the trailing end 41 to a location of weakest magnetization near the leading end 42. So magnetized, the magnets 34 and 36 position the rotor 35 in the noncogged position shown. When current $i_4$ flows, the stator field is nearly 180 electrical degrees out of phase with the rotor field and the torque on the rotor will start the rotor rotating.

Figure 5:
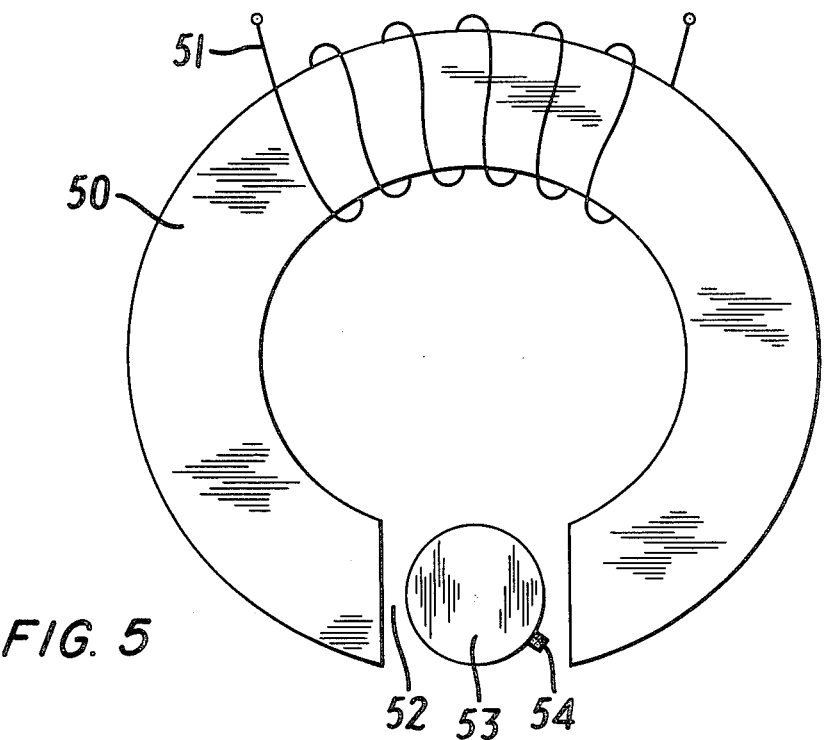
FIG. 5 is a diagrammatic illustration of a toroid interrupted by an air gap with a coil wound on the toroid and with a fixture used to position a rotor for treatment in the air gap.
Figure 6:
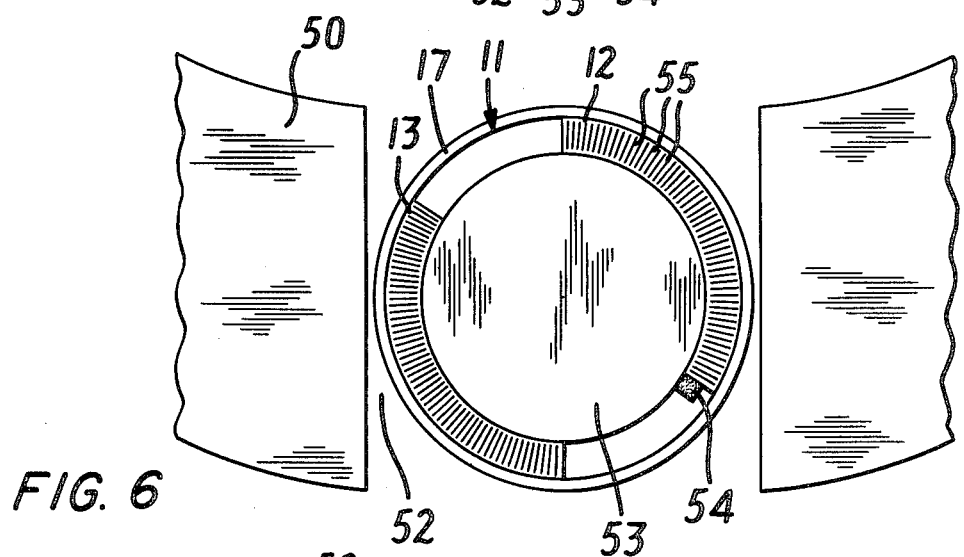
FIG. 6 is a fragmentary diagrammatic illustration of a rotor mounted on a fixture in the air gap of the toroid of FIG. 5 before treatment.
Figure 7:
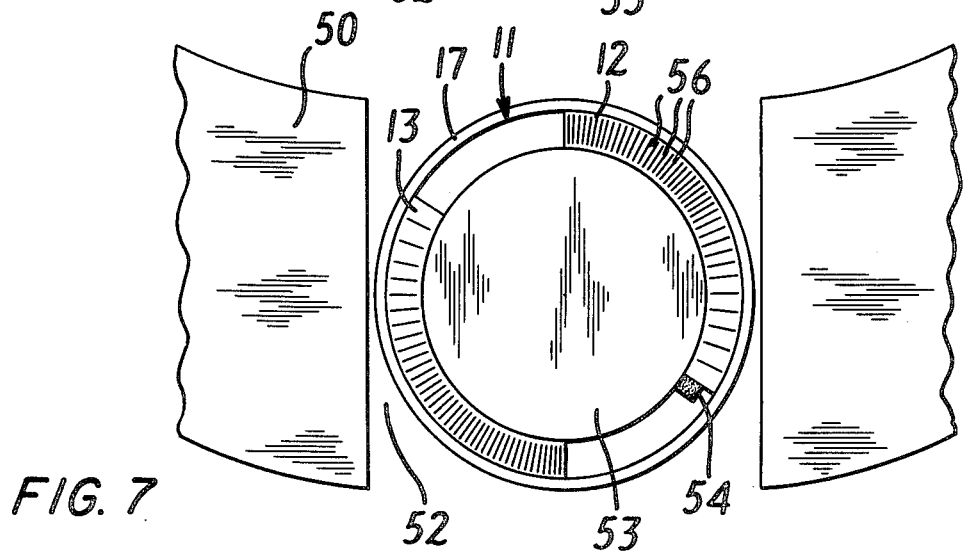
FIG. 7 is a fragmentary diagrammatic illustration of a rotor mounted on a fixture in the air gap of the toroid of FIG. 5 after treatment.

FIGS. 5, 6 and 7 illustrate how a direct current motor having permanent magnets with varying magnetization can be made. A toroid 50 is interrupted by an air gap 52. A coil 51 is wound on the toroid, and a fixture 53 is located in the air gap. A key 54 is located on the fixture.

In FIG. 6, a rotor 11, structurally like those of FIGS. 1 and 2, is placed on the fixture in the air gap of the toroid. The rotor magnets 12 and 13 have been conventionally magnetized. The magnetization of each rotor magnet is uniform from one end to the other end, as indicated by the lines 55.

The key on the fixture correctly positions, at a predefined angle, the rotor so that the magnetic field in the air gap, which is produced upon energization of the coil on the toroid, varies in its magnetic effect upon the rotor magnets with respect to locations on the rotor magnets. The fixture positions the rotor in the air gap so that one end of each rotor magnet is nearer the air gap-toroid boundary than the other end of the rotor magnet. The key and the fixture can be any of a number of mechanical arrangements adapted for the particular rotor to be angularly located.

With the rotor 11 correctly positioned, the coil 51 is energized to produce a magnetic field in the air gap 52. The coil is energized by a sufficient current so that the magnetic field produces the desired varying magnetization of the rotor magnets. If the rotor housing 17 is made of a ferromagnetic material, the magnetic field must be strong enough to saturate the material and produce the desired varying magnetization of the rotor magnets. The field interacts with the rotor magnets to demagnetize portions of the rotor magnets nearest the toroid more than other portions.

In FIG. 7, the resultant magnetization of the rotor magnets 12 and 13 is indicated by the lines 56 and is like that of the rotor magnets in FIG. 2. After treatment, the rotor is removed from the fixture and assembled in operative association with the stator 14 so that the varying magnetization of the rotor magnets produces the noncogged position of the rotor as in FIG. 2.

Although specific preferred embodiments have been described in detail, modifications within the spirit and scope of this invention will readily be apparent. For example, the rotor magnets could be magnetized initially to have a varied magnetization (varied flux density), rather than first magnetized uniformly and then partially demagnetized. The invention is not limited to rotors with just two poles and, as pointed out above, is not limited to any particular commutation scheme. Accordingly, the foregoing description of the preferred embodiments is not to be construed as limiting the scope of this invention as defined in the appended claims.

I claim:

1. A self-starting, direct current motor comprising first and second relatively rotatable members;
at least one winding and at least one salient pole on the first member;
at least one radially magnetized permanent magnet having a surface defining an arcuate sector of one magnetic polarity and facing the first member across an air gap, the arcuate sector extending less than 360°, the sector being a continuous single piece of magnetic material
said motor having at least one cogged position at a first angular relationship of the first and second members at which relative rotational forces between the first and second members are in equilibrium when the winding is energized;
said permanent magnet in said arcuate sector having circumferentially varying magnetic strength defining a location of increased magnetic strength nearer one end of the arcuate sector than the other end thereof in the circumferential direction; and
said salient pole and said location of increased magnetic strength being located to attract said first and second members away from said cogged position to an at-rest relative angular position that is angularly removed from the cogged position.

2. The motor of claim 1, wherein the first member having the winding and the salient pole is a stator and the second member having the permanent magnet with varying magnetization is a rotor.

3. The motor of claim 1, wherein the arcuate sector of one magnetic polarity is one of several sectors of varying magnetic strength that are arcuate in shape.

4. The motor of claim 3, wherein the sectors are diametrically opposed and mounted concentrically on a cylindrical rotor forming said first member and amounted to rotate around a salient pole stator forming said second member.

5. The motor of claim 3, wherein said sectors comprise permanent magnet segments arranged on the rotor to cooperate with at least one stator field produced by energization of the winding to attract the magnets and turn the rotor, each of said segments varying in their magnetization in a circumferential direction from a location of stronger magnetization circumferentially nearer an end of the segment to at least one location of weaker magnetic strength, said varied magnetization of each of said segments contributing to producing an at-rest position of the rotor angularly offset from the cogged position thereof.

6. The motor of claim 2, wherein the permanent magnet is a rotor magnet responsive to energization of the stator winding to cause rotation of the rotor and gradually varying in magnetic strength in said sector from said location of increased strength to a location of weakest magnetization near the other end thereof.

7. The motor of claim 4, 5 or 6, wherein the varied magnetization of the rotor magnets produces the at-rest position of the rotor position angularly offset in the direction of rotor rotation from a cogged position.

8. The motor according to claim 1 wherein the arcuate sector is a segment physically ending at each sector end and the position of increased magnetic strength is closer, in the circumferential direction, to one physical end of the segment than the other end thereof.

* * * * *